(12) United States Patent
Tate (10) Patent No.: US 9,918,601 B2
(45) Date of Patent: Mar. 20, 2018

(54) BLOWER VACUUM DEVICE AND ATTACHMENT THEREOF

(71) Applicant: BLACK & DECKER INC., Newark (DE)

(72) Inventor: Clare Tate, Durham (GB)

(73) Assignee: BLACK & DECKER INC., New Britain, CT (US)

( * ) Notice: Subject to any disclaimer, the term of this patent is extended or adjusted under 35 U.S.C. 154(b) by 897 days.

(21) Appl. No.: 14/161,944

(22) Filed: Jan. 23, 2014

(65) Prior Publication Data

US 2014/0310911 A1    Oct. 23, 2014

(30) Foreign Application Priority Data

Apr. 17, 2013    (EP) ..................................... 13164143

(51) Int. Cl.
| | |
|---|---|
| *A47L 5/14* | (2006.01) |
| *A47L 9/14* | (2006.01) |
| *A01G 1/12* | (2006.01) |

(52) U.S. Cl.
CPC ............ *A47L 9/1427* (2013.01); *A01G 1/125* (2013.01); *A47L 5/14* (2013.01); *A47L 9/14* (2013.01)

(58) Field of Classification Search
CPC ..... A47L 5/14; A47L 5/24; A47L 9/14; A47L 9/1427
USPC ........................................ 15/327.5, 330, 344
See application file for complete search history.

(56) References Cited

U.S. PATENT DOCUMENTS

| | | | |
|---|---|---|---|
| 1,836,336 A | 12/1931 | Replogle | |
| 1,939,579 A | 12/1933 | Swartz | |
| 2,009,455 A | 7/1935 | Replogle | |
| 2,257,705 A | 9/1941 | Seyfried | |
| 2,827,311 A | 3/1958 | Kasper | |
| 3,618,157 A * | 11/1971 | Bassin | ................... E01H 1/0836 15/330 |
| 4,269,571 A * | 5/1981 | Shikutani | ................... A47L 5/14 15/405 |
| 4,290,165 A * | 9/1981 | Hiramatsu | .......... A01M 9/0038 15/330 |
| 4,694,528 A * | 9/1987 | Comer | ....................... A47L 5/14 15/330 |
| 4,870,714 A * | 10/1989 | Miner | ........................ A47L 5/14 15/327.5 |
| 5,107,564 A | 4/1992 | Grumbles | |
| 5,294,063 A * | 3/1994 | Bote | ...................... A01G 3/002 15/329 |
| 5,535,479 A * | 7/1996 | Pink | .......................... A47L 5/14 15/330 |

(Continued)

FOREIGN PATENT DOCUMENTS

JP    2002326160    11/2002

OTHER PUBLICATIONS

Canadian Office Action dated Feb. 24, 2016 for Canadian Application No. 2,836,979.

*Primary Examiner* — Michael Jennings (74) *Attorney, Agent, or Firm* — John Yun (57) ABSTRACT

An attachment for a blower vacuum device comprising a collection bag; a coupler for removeably coupling the attachment to an air outlet of the blower vacuum device and for directing air from the air outlet into the collection bag; and a rotatable cuff fixed to the collection bag and rotatably mounted to the coupler such that the collection bag is rotatable with respect to the air outlet.

14 Claims, 8 Drawing Sheets

(56) References Cited

U.S. PATENT DOCUMENTS

| | | | | |
|---|---|---|---|---|
| 5,604,954 A * | 2/1997 | Webster | .................... | A47L 5/14 |
| | | | | 15/330 |
| 5,647,314 A * | 7/1997 | Matsumura | ........ | F02M 35/1255 |
| | | | | 123/184.57 |
| 5,689,852 A | 11/1997 | Svoboda et al. | | |
| 5,979,013 A * | 11/1999 | Beckey | .................. | A01G 1/125 |
| | | | | 15/326 |
| 6,442,790 B1 * | 9/2002 | Svoboda | ................ | A01G 1/125 |
| | | | | 15/319 |
| 6,988,293 B2 * | 1/2006 | Ritter | .................... | A01G 1/125 |
| | | | | 15/330 |
| 7,093,589 B2 * | 8/2006 | Sorersen | ................ | F02B 37/00 |
| | | | | 123/25 A |
| 7,735,188 B2 * | 6/2010 | Shaffer | ................ | E01H 1/0809 |
| | | | | 15/339 |
| 8,100,416 B1 * | 1/2012 | Bloomfield | ............... | B62B 1/22 |
| | | | | 280/43.1 |
| 8,104,138 B2 * | 1/2012 | Schliemann | ........... | A01G 1/125 |
| | | | | 15/330 |
| 9,265,391 B2 * | 2/2016 | Walker | .................... | A01G 1/125 |
| 2004/0143931 A1 * | 7/2004 | Dennis | ................ | E04D 13/0765 |
| | | | | 15/414 |
| 2004/0221416 A1 * | 11/2004 | Ritter | .................... | A01G 1/125 |
| | | | | 15/347 |
| 2005/0193517 A1 | 9/2005 | Svoboda et al. | | |
| 2007/0101535 A1 * | 5/2007 | Maier | .................... | A01G 1/125 |
| | | | | 15/346 |
| 2007/0145063 A1 * | 6/2007 | Kaczmarek | ........... | A47L 9/1427 |
| | | | | 221/63 |
| 2012/0138717 A1 * | 6/2012 | Svoboda | ................ | A01G 1/125 |
| | | | | 241/56 |

* cited by examiner

BLOWER VACUUM DEVICE AND ATTACHMENT THEREOF

CROSS-REFERENCE TO RELATED APPLICATIONS

This application claims priority to European Patent Application No. 13164143.3 filed Apr. 17, 2013. The entire contents of that application are expressly incorporated herein by reference.

FIELD OF THE INVENTION

The present invention relates to a blower vacuum device and an attachment for a blower vacuum device.

BACKGROUND OF THE INVENTION

Blower vacuum devices or "blower vacs" are used to clean outdoor spaces. A blower vacuum device comprises a fan which can be powered by an electric motor or by other means such as a gasoline powered engine. A blower vacuum device has two modes; a blow mode and a vacuum mode. In the blow mode the blower vacuum ejects a fast moving stream of air which can be used to move and direct debris by a user. In the vacuum mode the blower vacuum sucks air and debris in to the blower vacuum. Typically the debris is held in a collection bag which can be emptied periodically by the user.

Various solutions have been proposed to achieve both vacuum and blowing functions with a blower vacuum device. One such solution is to have a fan configured to rotated in one direction and require the user to change the attachments to the air inlet and air outlet as required for the blowing function or the vacuum mode.

For example, in blow mode the air will be drawn in via an air inlet and the air inlet is covered by an air grill. The air will be blown out via an air outlet and a blowing tube is connected to the air outlet. In vacuum mode the air is still drawn in via the air inlet, but the air grill is replaced with a vacuum tube. In vacuum mode the air and the debris is blown out of the air outlet and into a collection bag which is connected to the air outlet.

Different handles can be provided to allow the user to grip the blower vacuum device in different orientation according to whether the user is using the blower vacuum in blow mode or vacuum mode.

US 2007/0157424 discloses a blower vacuum device which provides a bag carrying device. The bag carrying device comprises a bag body, a bag opening and a bag carrying assembly for removable engagement with the blower vacuum device. A problem with this arrangement is that when the user is sucking up wet leaves or other unpleasant material, the bag will become wet and/or soiled. Since the air is blown into the bag, the bag has to allow the air to diffuse out otherwise the bag would burst from the increased air pressure. Bags which allow air to diffuse out can also allow some moisture out of the bag as well. When the bag is slung over the user's shoulder, the bag will rest at the side of the user and this is unpleasant for the user if the bag and its contents are wet because this can make the user wet.

BRIEF SUMMARY OF THE INVENTION

Embodiments of the present invention aim to address the aforementioned problems.

According to an aspect of the present invention there is an attachment for a blower vacuum device comprising: a collection bag; a coupler for removeably coupling the attachment to an air outlet of the blower vacuum device and for directing air from the air outlet into the collection bag; and a rotatable cuff fixed to the collection bag and rotatably mounted to the coupler such that the collection bag is rotatable with respect to the air outlet.

According to another aspect of the present invention there is a blower vacuum device comprising: a housing having an air inlet and an air outlet; a motor mounted in the housing and configured to drive a fan for generating an air flow; a vacuum tube attachment mounted to the air inlet for receiving air and/or debris into the blower vacuum; a collection bag; a coupler for removeably coupling the attachment to the air outlet of the blower vacuum device and for directing air from the air outlet into the collection bag; and a rotatable cuff fixed to the collection bag and rotatably mounted to the coupler such that the collection bag is rotatable with respect to the air outlet.

The rotatable cuff allows the collection bag to be orientated in multiple positions and still allow the blower vacuum device to function. For example, the bag can be rotated in a first position whereby the bag can be slung at the side of the user. When the bag is slung over the shoulder, the user does not have to carry the weight of the bag with their hands. In this position the blower vacuum device can be easier to manoeuvre. Alternatively the bag can be rotated into a second position whereby the bag is positioned under the vacuum tube. In this position the bag is not by the side of the user and this can avoid the user getting wet from damp leaves. The rotatable cuff means the blower vacuum device is more adaptable and convenient to use.

Preferably coupler comprises stopping elements for limiting the axial movement of the rotatable cuff with respect to the coupler. This means that the rotatable cuff and the collection bag can be freely rotated with respect to the coupler and the blower vacuum device and the collection bag will not detach from the air outlet of the blower vacuum device. The stopping elements may comprise circumferential flanges. In some embodiments the air outlet and the coupler are tube shaped and may have a substantially circular cross section. The rotatable cuff may also have a substantially circular cross section. The circumferential flanges may protrude from an outer surface of the coupler. The circumferential flanges protrude a distance from the outer surface of the coupler such that the circumferential flanges overlap with the rotatable cuff. The diameter of the circumferential flanges is greater that the diameter of the inner surface of the rotatable cuff.

Preferably an attachment according to any of the preceding claims wherein the rotatable cuff comprises resilient clips configured to provide a snap fit around the coupler. This means that the rotatable cuff can be manufactured separately from the coupler. The rotatable cuff can then be mounted on the coupler such that the rotatable cuff is not removable from the coupler. The snap fit can provide a one time snap fit of the rotatable cuff on the coupler. Preferably the resilient clips are deformable and flex such that the inner diameter of the rotatable cuff permits the rotatable cuff to be passed over the stopping elements on the coupler.

Alternatively the rotatable cuff can be moulded around the coupler. In another embodiment the rotatable cuff can be formed in two parts which are fixed together around the coupler during manufacture.

Preferably the collection bag is fixed with respect to the rotatable cuff with one or more of the following; adhesive, cable ties, elasticated gripping elements or any other means for fixing the collection bag to the rotatable cuff.

Preferably the coupler comprises a clip receiving portion configured to receive a clip mounted on the air outlet. Alternatively the coupler comprises a clip for inserted into a clip receiving portion on the air outlet of the blower vacuum device. The coupler can be part of a clip mechanism which locks the attachment to the blower vacuum device. Alternatively or additionally the coupler comprises other means for attaching the attachment to the blower vacuum device. The coupler can be configured to provide a friction push fit between the coupler and the air outlet.

Preferably the attachment comprises a diffuser configured to direct the air into the bag in a direction different from the direction of the air ejected from the coupler. In some orientations of the collection bag, the air flow will be directed to the wall of the collection bag. Typically the air flow into the collection bag will comprise air plus debris. The debris can have an abrasive effect on the collection bag. This means that the collection bag can more quickly wear away in some positions. The diffuser will absorb some of the energy of the debris can will slow the air flow down. The diffuser can direct the air flow and debris away from the wall of the collection bag. This means that the air flow and the debris will lose kinetic energy as it passes into the collection bag and the debris will fall to the bottom of the collection bag before it hits the wall of the collection bag. Preferably the diffuser is fixedly mounted to the coupler. More preferably the diffuser is fixedly mounted to the rotatable cuff. This means that the diffuser will rotate when the rotatable cuff rotates. This means that the air flow emerging from the diffuser always be directed into the same direction with respect to the collection bag.

Preferably the coupler comprises a neck portion having a width smaller than the width at another part of the coupler wherein the neck portion provides a bearing surface for receiving the rotatable cuff. In this way the neck portion of the coupler provides a surface and the rotatable cuff rotates by following the neck portion. This makes the rotation of the rotatable cuff smoother and easier.

Optionally the collection bag comprises a shoulder strap for orientating the bag in a position to the side of the user. This allows the user to shoulder the weight of the collection bag during use. Alternatively or additionally the collection bag comprises means for holding the collection bag in a position near the user. The collection bag can comprise a belt clip or harness for attaching the collection bag to the user.

Optionally the collection bag comprises a fastener for fastening the collection bag to a vacuum tube of the blower vacuum tube and for orientating the collection bag in a position under the vacuum tube. The fastener prevents the collection bag from dragging along the ground. The fastener may be a clip and loop arrangement. The vacuum tube may comprise a hook and the collection bag may comprise a loop of material for hooking on the hook. Alternatively the fastener is not required in other circumstances. For example the bag may be small enough not to drag along the ground, but still hang beneath the blower vacuum device during use.

Preferably the rotatable cuff is mounted over an outside surface of the coupler. Preferably the rotatable cuff comprises ribs for engaging the outer surface of the coupler. The ribs prevent the rotatable cuff from rattling as it rotates around the coupler.

Preferably the rotatable cuff comprises a clamping member moveable between a release position and a clamp position, wherein in the clamp position the clamping member is configured to clamp the collection bag against the rotatable cuff. The clamping member allows the collection bag to be replaced. This means that disposable collection bags can be used with the rotatable cuff.

BRIEF DESCRIPTION OF THE DRAWINGS

Various other aspects and further embodiments are also described in the following detailed description and in the attached claims with reference to the accompanying drawings, in which:

DETAILED DESCRIPTION OF THE INVENTION

Figure 1:
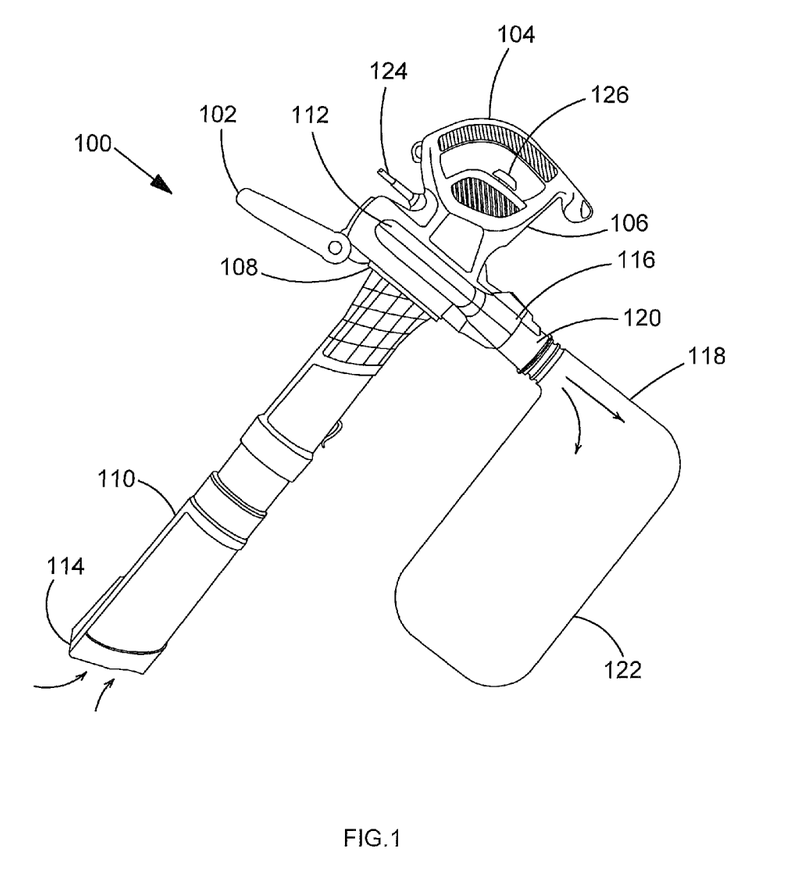
FIG. 1 shows a perspective view of the blower vacuum device with the bag according to an embodiment.

FIG. 1 shows a perspective view of a blower vacuum device 100 in vacuum mode. The blower vacuum device 100 comprises a primary handle 104 and a secondary handle 102 for the user to grip the blower vacuum device 100 in vacuum mode. The blower vacuum device 100 comprises a housing 106 which is typically formed from two clamshell halves (not shown). The two clamshell halves are fixed together with screws or a similar means for securing the two halves of the clamshells together.

A motor (not shown) is mounted within the housing 106 and the motor is configured to drive a fan (not shown). The blower vacuum device 100 is configured to operate in two modes; blow mode and vacuum mode. For the purposes of this description, the blower vacuum device 100 is only shown in vacuum mode. In an alternative embodiment the invention can be used on a vacuum only device. The motor is electric and the blower vacuum 100 is connected to external power supply via a power cord 124, which is partially shown. The actuation and for the speed of the motor is controlled via a control knob 126.

The fan rotates within the housing 106 in the involute 112. The fan generates an air flow which draws air in via an air inlet 108. In vacuum mode a vacuum tube 110 is coupled to the housing 106 over the air inlet 108. The vacuum tube 110 is secured to the housing via a coupling means (not shown). The coupling means for securing the vacuum tube 110 is known and will not be described in further detail. The vacuum tube 110 is removable and is replaced with an air grill (not shown) in blow mode. Air and debris is drawn into the vacuum tube 110 at the vacuum tube opening 114 and is sucked up into the air inlet 108.

The fan is configured to blow an air stream out of an air outlet 116 and into an attachment 118. In some embodiments the fan is a "dirty" fan. This means that the debris comes into contact with the fan and the fan mulches the debris. This means that the debris is shredded and pulverised into smaller pieces. The smaller pieces take up a smaller volume and more debris can be collected before emptying the blower vacuum device 100.

Typically the attachment 118 is a means for collecting the debris sucked up via the vacuum tube 110. The attachment 118 comprises a coupler 120 and a collection bag 122. The collection bag 122 in some embodiments comprises a zip (not shown) along one edge of the collection bag 122 for opening the bag. Alternatively the zip can be replaced with any suitable means for securely opening and closing the collection bag. For example strips of Velcro™ can alternatively be used. This allows the contents of the collection bag 122 to be emptied when the collection bag 122 becomes full. In some other embodiments the collection bag can be disposable and removable from the coupler 120.

Figure 2:
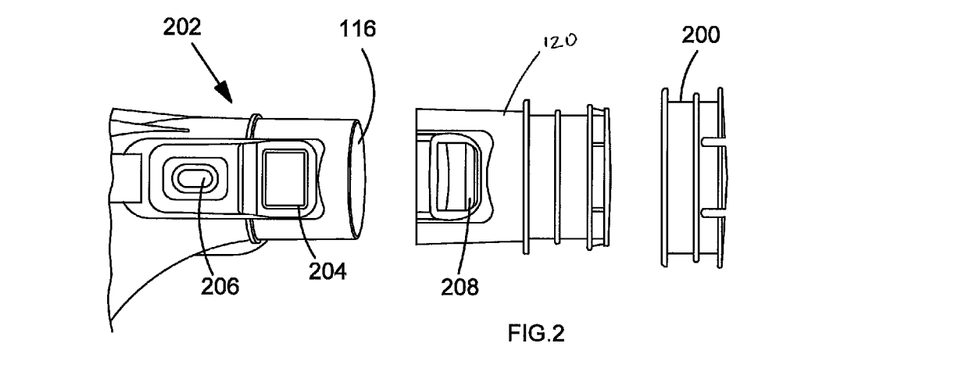
FIG. 2 discloses an exploded plan view of an air outlet, a coupler and a rotatable cuff according to an embodiment.

The coupler 120 and the air outlet 116 will now be discussed in further detail in reference to FIGS. 2 and 3. FIG. 2 discloses an exploded plan view of the air outlet 116, the coupler 120 and a rotatable cuff 200. The collection bag 122 is not shown in FIG. 2 for the purposes of clarity. The coupler 120 is mechanically coupled to the air outlet 116 via a coupling mechanism 202. The air outlet 116 and the coupler 120 are substantially tube shaped. The diameter of the outer surface of the air outlet 116 is smaller than the diameter of the inner surface of the coupler 120 such that the air outlet 116 fits inside the coupler 120.

In order to mount the coupler 120 on the air outlet 116, the user pushes the coupler 120 on to the air outlet 116. The coupling mechanism 202 comprises a clip portion 204 actuated by a release button 206 and a reciprocal recess 208 on the coupler 120. The clip portion 204 clips into a reciprocal recess 208 on the coupler 120. The clip portion 204 is biased with a spring 300 to the locked position. When the coupler 120 is pushed on to the air outlet 116 the clip portion 204 snaps into the recess 208.

Figure 3:
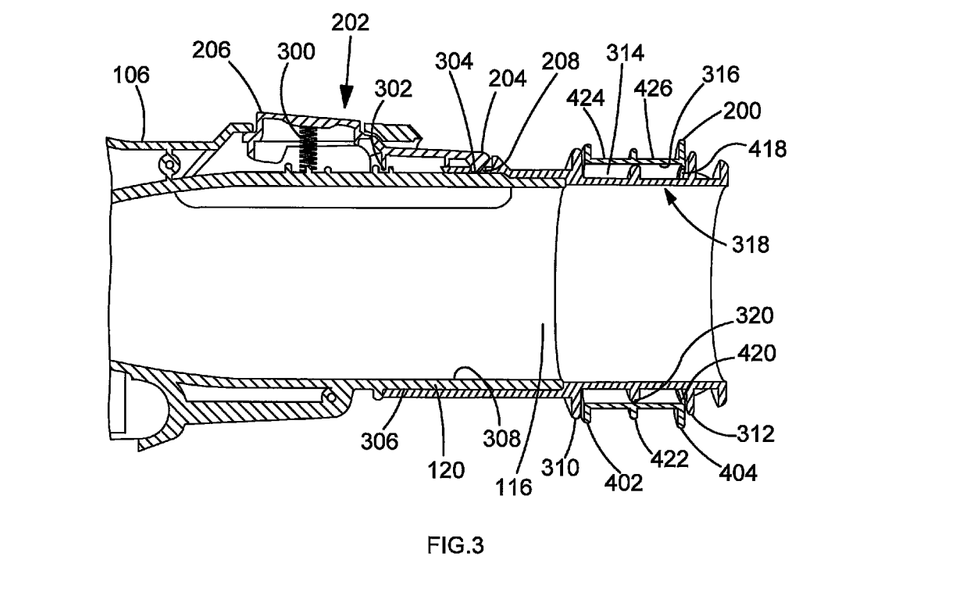
FIG. 3 shows a cut away side view of the coupler mounted on the air outlet according to an embodiment.

FIG. 3 shows a cut away side view of the coupler 120 mounted on the air outlet 116. The collection bag 122 is not shown for the purposes of clarity. The air outlet 116 is integral with the housing 106. The coupling mechanism 202 can be seen in more detail. The release button 206 is integral with the clip portion 204. A spring 300 is located under the release button 202 and biases the clip portion 204 into the locked position. The clip portion 204 and the release button 206 pivot about a fulcrum 302. The clip portion 204 comprises a retaining portion 304 which abuts against the wall of the recess 208 and prevents the coupler 120 being removed from the air outlet 116. To release the coupler 120 from the air outlet 116, the release button 206 is depressed and the clip portion 204 is raised out of the recess 208. The user then pulls the coupler 120 off the air outlet 116. FIG. 3 clearly shows the outer surface 306 of the air outlet 116 adjacent to the inner surface 308 of the coupler 120.

The rotatable cuff 200 will now be discussed in further detail in reference to FIGS. 3, and 4.

Figure 4A:
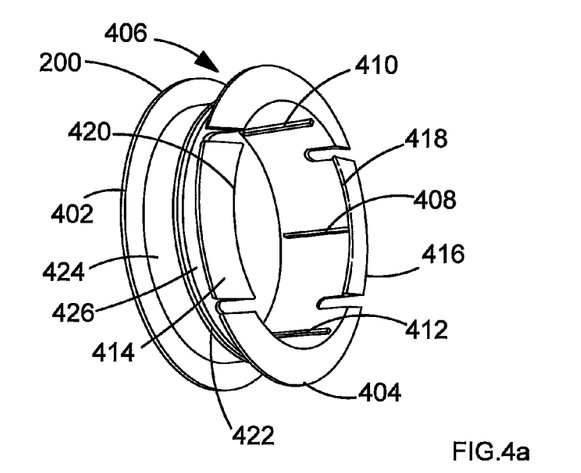
FIG. 4a discloses a perspective view of the rotatable cuff according to an embodiment.
Figure 4B:
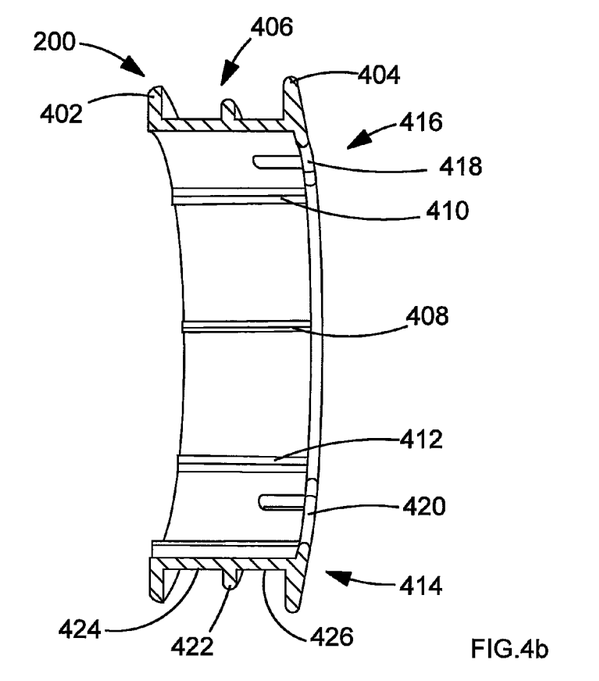
FIG. 4b discloses a cut away side view of the rotatable cuff according to an embodiment.

Reference will now be made to FIG. 4a, which discloses a perspective view of the rotatable cuff 200 and FIG. 4b which discloses a cut away side view of the rotatable 200. The rotatable cuff 200 is substantially circular in cross section. The rotatable cuff 200 has a central portion 406 and two end flanges 402, 404 at either end thereof. The central portion 406 comprises a smaller central flange 422, separating the central portion 406 into two troughs 424, 426. The inner surface 316 of the rotatable cuff 200 comprises ribs 408, 410, 412. The rotatable cuff 200 comprises resilient flexible clip portions 414, 416. The resilient flexible clip portions 414, 416 deform and bend outwardly when the rotatable cuff 200 is mounted on the coupler 120. The resilient flexible clip portions 414, 416 comprise lips 418, 420 which protrude inwardly. This means that the internal diameter of the rotatable cuff 200 is smallest at flange 404 by virtue of the lips 418, 420 of the clips 414, 416. The lips 418, 420 can be better viewed from FIG. 3 and FIG. 4b.

Turning back to FIG. 3, the rotatable cuff 200 is mounted over the coupler 120 at an end portion distal from the coupling mechanism 202. The rotatable cuff 200 is rotatably mounted to the coupler 120 to allow rotation of the rotatable cuff 200 about the coupler 120. Axial movement of the rotatable cuff 200 along the coupler 120 is limited by stopping elements or circumferential flanges 310, 312. The stopping elements 310, 312 can be any means for preventing or substantially limiting axial movement of the rotatable cuff 200 with respect to the coupler 120. In some embodiments the stopping elements 310, 312 are first and second circumferential flanges 310, 312.

First and second circumferential flanges 310, 312 protrude from the outer surface 314 of the coupler 120 by a distance such that the circumferential flanges 310, 312 overlap with the rotatable cuff 200. In other words, the diameter of the circumferential flanges 310, 312 is greater that the diameter of the inner surface 316 of the rotatable cuff 200. In some embodiments the first circumferential flange 310 protrudes are greater distance from the outer surface 314 of the coupler 120 than the second circumferential flange 312. The second circumferential flange 312 is smaller to allow the rotatable cuff 200 to be mounted on the coupler 120.

When the rotatable cuff 200 is mounted on the coupler 120, the resilient flexible clips 414, 416 deform and bend such that the lips 418, 420 can deflect. This increases the inner diameter of flange 404 and allows the rotatable cuff 202 to pass over the smaller second circumferential flange 312. The resilient flexible clips 414, 416 are configured to provide a snap fit around the coupler 120. This means that the rotatable cuff 200 can be manufactured separately from the coupler 120. The rotatable cuff 200 can then be mounted on the coupler 120 such that the rotatable cuff 200 is not removable from the coupler 120. The snap fit can provide a one time snap fit of the rotatable cuff 200 on the coupler 120.

Although not shown, in some embodiments the coupler 120 comprises a neck portion having a width smaller than the width at another part (for example at the end of the coupler 120) wherein the neck portion provides a bearing surface for receiving the rotatable cuff 200.

The neck portion and/or the circumferential flanges 310, 312 defines a bearing surface such as annular groove 318 and the rotatable cuff 200 rotates within the annular groove by following the neck portion. Since the rotatable cuff 120 is constrained by the bearing surface 318 and makes the rotation of the rotatable cuff 200 smoother and easier.

When the rotatable cuff 200 is mounted on the coupler 120, the ribs 408, 410, 412 abut against a third flange 320 on the coupler 120. The third flange 320 is smaller than the first and second flanges 310, 312. The ribs 408, 410, 412 decrease the internal diameter of the rotatable cuff 200 and mean that the rotatable cuff 200 does not rattle when mounted on the coupler 120.

Figure 5:
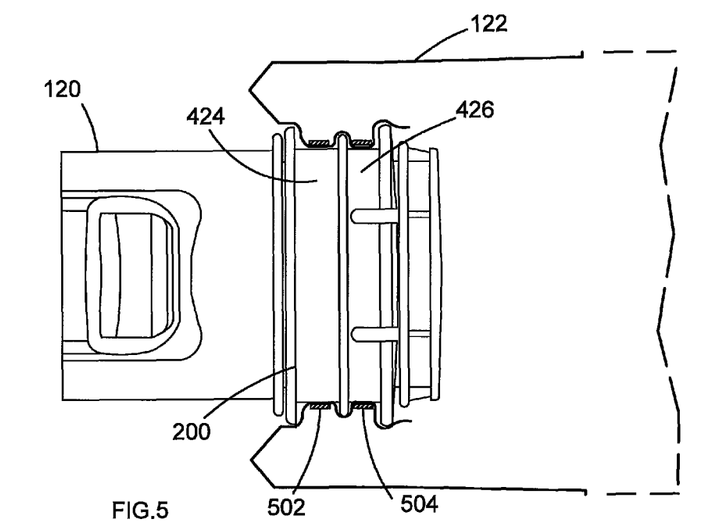
FIG. 5 shows a schematic plan view of the coupler, rotatable cuff and the collection bag according to an embodiment.

The rotatable cuff 200 will now be discussed in reference to FIG. 5. FIG. 5 shows a schematic plan view of the coupler 120, rotatable cuff 200 and the collection bag 122. For the purposes of clarity the collection bag 122 has been shown only next to the coupler 120 and the rotatable cuff 200. The rotatable cuff 200 is mounted to the coupler 120 as previously described. The collection bag 122 is fixed with respect to the rotatable cuff 200. In some embodiments the collection bag is made from a flexible textile or other material which permits air to diffuse out of the collection bag 122.

The collection bag 122 is fixed with respect to the rotatable cuff 200 with cable ties 502, 504. The cable ties 502, 504 are wrapped around the rotatable cuff 200 such that the collection bag 122 is between the cable ties 502, 504 and the rotatable cuff 200. In some embodiments the cable ties 502, 504 are located in the troughs 424, 426. In other embodiments additional or alternative options for fixing the collection bag 122 to the rotatable cuff are used. For example elasticated gripping elements sewn into the bag or adhesive can be used to fix the collection bag 122 to the rotatable cuff 200. In other embodiments any means for fixing the collection bag to the rotatable cuff can be used.

Figures 6A, 6B:
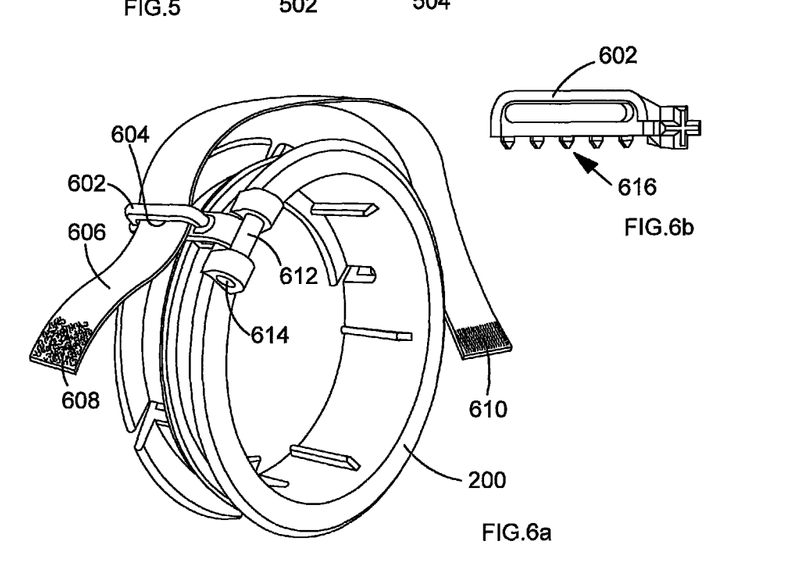
FIG. 6a discloses a perspective via of a rotatable cuff with an alternative means for fixing the collection bag to the rotatable cuff according to an embodiment.
FIG. 6b shows a side view of a clamping member according to an embodiment.

An alternative embodiment for fixing the collection bag 122 to the rotatable cuff 200 will now be discussed in reference to FIGS. 6a and 6b. FIG. 6a discloses a perspective via of a rotatable cuff 200 with an alternative means for fixing the collection bag 122 to the rotatable cuff 200.

The rotatable cuff 200 is the same as the rotatable cuff 200 described in reference to the previous embodiments except that the rotatable cuff 200 comprises a clamping member 602 moveable between a release position and a clamp position. FIG. 6a shows the clamping member 602 in the clamp position. The clamping member 602 comprises a loop 604 for receiving a fastening belt 606. The fastening belt 606 comprises a flexible material and is adapted to wrap around the collection bag 122 material similar to the cable ties as described in reference to FIG. 5. The fastening belt 606 comprises means for securing 608, 610 such as a loop and hook or any other suitable means for securing. For example, the fastening belt 606 can comprise Velcro™ portions 608, 610 to secure the fastening belt 606. When the fastening belt 606 is secure and the clamping member 602 is in the clamp position the collection bag is fixed against the rotatable cuff 200. The clamping member 602 is pivotable about a pivot pin 612 in a pivot hole 614 between the clamp position and the release position. In some embodiments the clamping member 602 comprises a friction lock in the clamp position to prevent the clamping member 602 from moving. The pivot pin 612 and the pivot hole 614 have a non-circular cross section such as an oval. When the clamping member 602 is in the clamping position, the pivot pin 612 wedges against the pivot hole 614 providing the friction lock.

The clamping member 602 may comprise gripping teeth 616 for gripping the collection bag 122 as shown in FIG. 6b. In some embodiment the rotatable cuff 200 comprises a plurality of clamping members 602 for clamping the collection bag 122 to the rotatable cuff. In this way in some embodiments the fastening belt is not required if sufficient clamping members 602 are provided.

In some embodiments the releasable feature of the clamping member 602 and/or the fastening belt 606 allows the collection bag 122 to be released from the rotatable cuff 200. This means that disposable collection bags can be used with the rotatable cuff 200.

Figure 7:
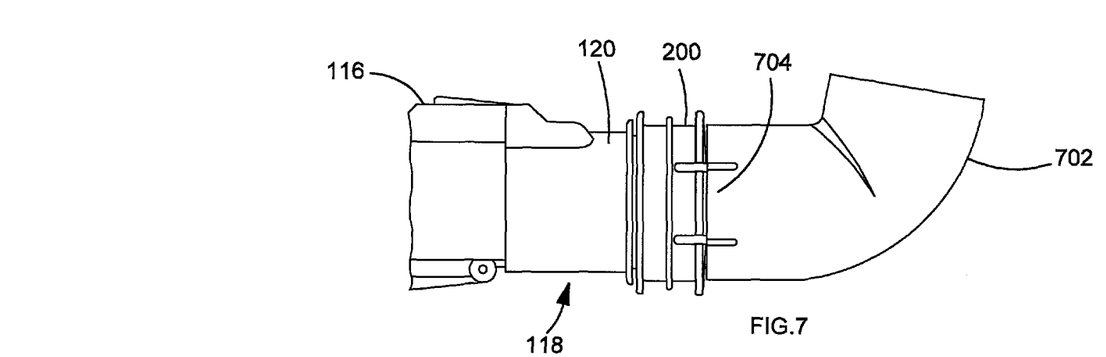
FIG. 7 shows a side view of the attachment coupled to the air outlet according to an embodiment.
Figure 8:
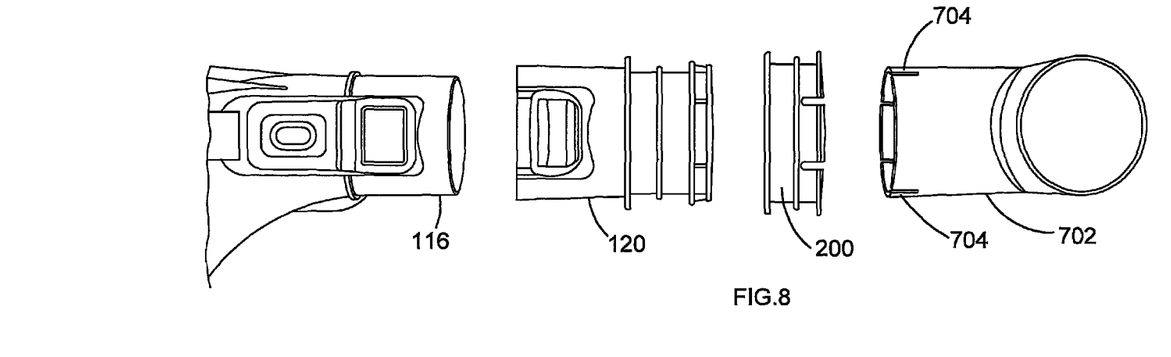
FIG. 8 shows an exploded plan view of an attachment according to an embodiment.

An alternative embodiment will now be described in reference to FIGS. 7 and 8. FIG. 7 discloses a side view of the attachment 118 coupled to the air outlet 116. FIG. 8 shows an exploded plan view of the same attachment 118.

The attachment 118 as shown in FIGS. 7 and 8 is the same as the attachment discussed in previous embodiments, except that the attachment further comprises a diffuser 702. For the purposes of clarity the collection bag 122 is not shown.

FIGS. 7 and 8 show the attachment 118 comprising a diffusion element 702 which is configured to direct the air flow into the bag in a direction different from the direction of the air ejected from the coupler 120. The diffuser 702 is fixed to the coupler 120. The diffuser 702 comprises resilient clip portions 704 which clip onto the end of the coupler 120. This means that the air flow will be directed away from the wall of the collection bag 122 in some positions. This reduces the debris abrading collection bag 122. The diffuser 702 will absorb some of the energy of the debris slowing the debris down. Some of the air flow and the debris will lose kinetic energy as it hits the diffuser 702 and passes into the collection bag 122. The debris will then fall to the bottom of the collection bag before it hits the wall of the collection bag 122.

Figure 9:
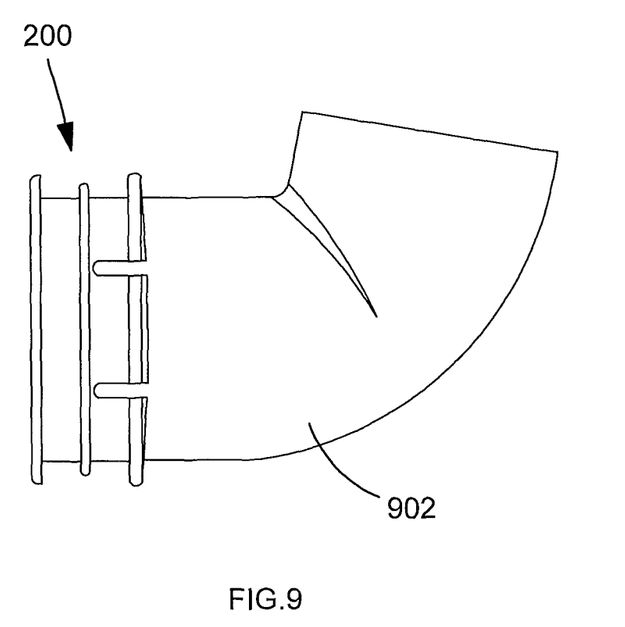
FIG. 9 shows a side view of a rotatable cuff fixed to a diffuser according to an embodiment.

Another embodiment is disclosed in FIG. 9. FIG. 9 shows a side view of a rotatable cuff 200 fixed to a diffuser 902. FIG. 9 shows a diffuser 902 which is the same as the diffuser of FIGS. 7 and 8, except that the diffuser 902 is fixed with respect to the rotatable cuff 200 and not the coupler 120. In some embodiments the diffuser 902 is integral with the rotatable cuff 200. In other embodiments the diffuser 902 is mounted to the rotatable cuff 200 with resilient clips (not shown). By fixing the diffuser 902 with respect to the rotatable cuff 200, the diffuser 902 will rotate when the rotatable cuff 200 rotates. This means that the air flow emerging from the diffuser 902 will always be directed into the same direction with respect to the collection bag 122. In this way the air flow can be directed so as not to be ejected straight into an adjacent wall of the collection bag 122.

Figure 10:
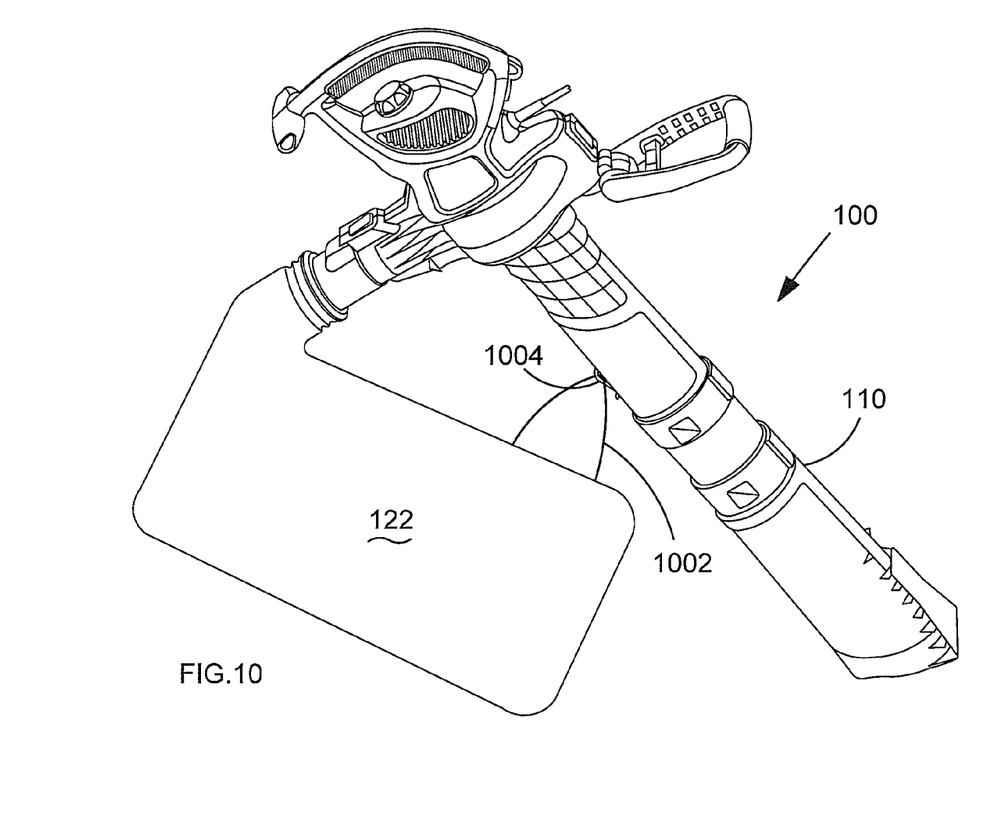
FIG. 10 shows a perspective view of the blower vacuum device with the collection bag slung underneath the vacuum tube according to an embodiment.
Figure 11:
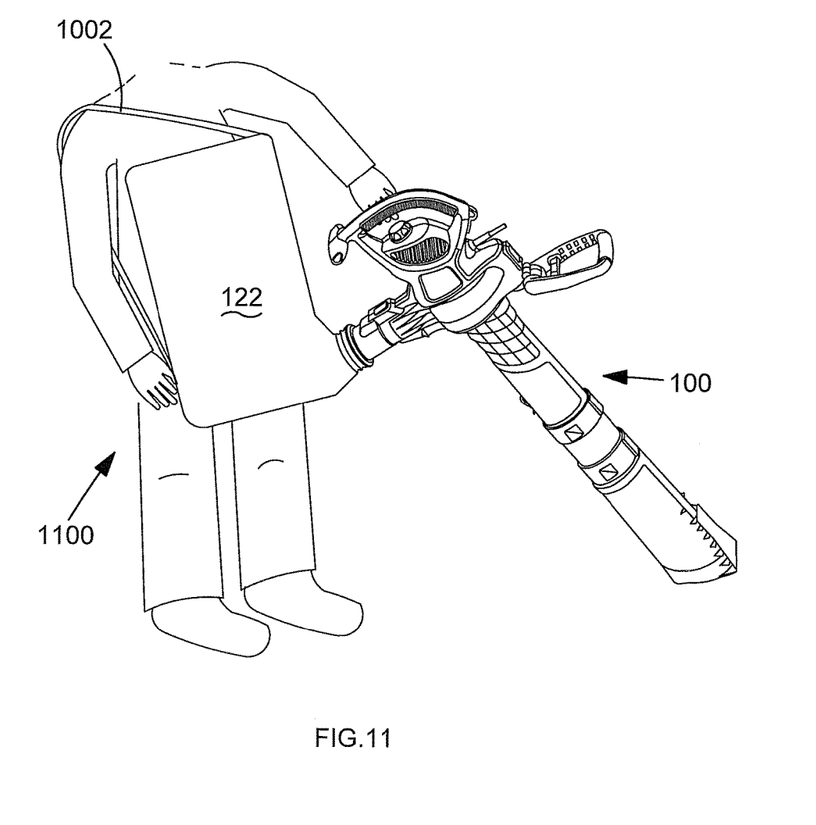
FIG. 11 shows a perspective view of the blower vacuum device with the collection bag in a position adjacent to a user according to an embodiment.

Use of the attachment 100 comprising the rotatable cuff 200 will now be discussed in reference to FIGS. 10 and 11. FIG. 10 shows a perspective view of the blower vacuum device 100 with the collection bag 122 slung underneath the vacuum tube 110. FIG. 11 shows a perspective view of the blower vacuum device 100 with the collection bag 122 in a position adjacent to a user.

FIG. 10 shows the collection bag 122 comprises a fastener 1002 for fastening the collection bag 122 to a vacuum tube 110 of the blower vacuum tube 100. The fastener 1002 orientates the collection bag 122 in a position under the vacuum tube 110. The fastener 1002 prevents the collection bag 122 from dragging along the ground. The fastener 1002 may be a clip or hook 1004 on the vacuum tube 110 and loop 1002 fixed to the collection bag 122. The loop 1002 is placed over the hook 1004 to keep the collection bag 122 in place. In some embodiments the fastener 1002 is not required in other circumstances. For example the collection bag 122 may be small enough not to drag along the ground, but still hang beneath the blower vacuum device during use.

As shown in FIG. 11 in some embodiments the collection bag 122 comprises a strap 1102 for attaching to a user. For example the strap 1102 can be place over a shoulder of the user. The strap 1102 orientates the bag in a position to the side of the user. This allows the user to shoulder the weight of the collection bag during use. Alternatively or additionally the collection bag 122 comprises means for holding the collection bag in a position near the user. The collection bag 122 can comprise a belt clip or harness for attaching the collection bag to the user.

In this way the attachment comprising a rotatable cuff 200 allows the position of the collection bag 122 to easily be changed by the user. This makes the blower vacuum more convenient to use.

Embodiments of the present invention have been discussed with particular reference to the examples illustrated. However it will be appreciated that variations and modifications may be made to the examples described within the scope of the invention.

The invention claimed is:

1. A blower vacuum device comprising:
a housing having an air inlet and an air outlet;
a motor mounted in the housing and configured to drive a fan for generating an air flow;
a vacuum tube mounted to the air inlet for receiving air and debris into the blower vacuum;
a collection bag;
a coupler for removeably coupling the collection bag to the air outlet of the blower vacuum device and for directing air from the air outlet into the collection bag; and
a rotatable cuff fixed to the collection bag and rotatably mounted to the coupler such that the collection bag is rotatable with respect to the air outlet.

2. The blower vacuum device according to claim 1 wherein the coupler comprises stopping elements for limiting the axial movement of the rotatable cuff with respect to the coupler.

3. The blower vacuum device according to claim 2 wherein the stopping elements comprise circumferential flanges.

4. The blower vacuum device according to claim 1 wherein the rotatable cuff comprise resilient clips configured to provide a snap fit around the coupler.

5. The blower vacuum device according to claim 1 wherein the collection bag is releasably fixed with respect to the rotatable cuff.

6. The blower vacuum device according to claim 1 wherein the coupler comprises a clip receiving portion configured to receive a clip mounted on the air outlet.

7. The blower vacuum device according to claim 1 further including a diffuser configured to direct the air into the collection bag.

8. The blower vacuum device according to claim 7 wherein the diffuser is fixedly mounted to the coupler or the rotatable cuff.

9. The blower vacuum device according to claim 1 wherein the coupler comprises a neck portion having a width smaller than the width at another part of the coupler wherein the neck portion provides a bearing surface for receiving the rotatable cuff.

10. The blower vacuum device according to claim 1 wherein the collection bag comprises a shoulder strap for orientating the bag in a position to the side of the user.

11. The blower vacuum device according to claim 1 wherein the collection bag comprises a fastener for fastening the collection bag to the vacuum tube for orientating the bag in a position under the vacuum tube.

12. The blower vacuum device according to claim 1 wherein the rotatable cuff is mounted over an outside surface of the coupler.

13. The blower vacuum device according to claim 12 wherein the rotatable cuff comprises ribs for engaging the outer surface of the coupler.

14. The blower vacuum device according to claim 1 wherein the rotatable cuff comprises a clamping member moveable between a release position and a clamp position, wherein in the clamp position the clamping member is configured to clamp the collection bag against the rotatable cuff.

* * * * *